United States Patent
DeBergalis et al.

(10) Patent No.: US 7,373,438 B1
(45) Date of Patent: May 13, 2008

(54) SYSTEM AND METHOD FOR REPRIORITIZING HIGH-LATENCY INPUT/OUTPUT OPERATIONS

(75) Inventors: Matthew S. DeBergalis, Cambridge, MA (US); Arthur F. Lent, Cambridge, MA (US); Jeffrey S. Kimmel, Chapel Hill, NC (US)

(73) Assignee: Network Appliance, Inc., Sunnyvale, CA (US)

( * ) Notice: Subject to any disclaimer, the term of this patent is extended or adjusted under 35 U.S.C. 154(b) by 655 days.

(21) Appl. No.: 10/829,854

(22) Filed: Apr. 22, 2004

Related U.S. Application Data

(62) Division of application No. 10/171,140, filed on Jun. 13, 2002, now abandoned.

(51) Int. Cl.
*G06F 3/00* (2006.01)
(52) U.S. Cl. .................... 710/40; 710/45; 711/114; 711/100; 707/1; 707/2; 707/200
(58) Field of Classification Search .............. 710/40
See application file for complete search history.

(56) References Cited

U.S. PATENT DOCUMENTS 5,572,686 A * 11/1996 Nunziata et al. ............ 710/116
5,956,493 A * 9/1999 Hewitt et al. ............... 710/113
6,006,303 A * 12/1999 Barnaby et al. ............ 710/244
6,151,538 A * 11/2000 Bate et al. ..................... 701/3
6,304,923 B1 * 10/2001 Klein ........................... 710/41
6,563,788 B1 * 5/2003 Torba et al. ................ 370/229
6,738,386 B1 * 5/2004 Holmqvist .................. 370/412
2002/0069310 A1 * 6/2002 Scandurra et al. .......... 710/240
2002/0075941 A1 * 6/2002 Souissi et al. .............. 375/133

OTHER PUBLICATIONS

The ATM Forum, Technical Committee, LAN Emulation Over ATM, Version 1.0, af-lane-0021.000, Jan. 1995.
The ATM Forum, Technical Committee, LAN Emulation Over ATM Version 1.0 Addendum, af-lane-0050.000, Dec. 1995.
RFC 1483 Multiprotocol Encapsulation Over ATM adaptation Layer 5, Jul. 1993.

* cited by examiner

*Primary Examiner*—Niketa Patel
(74) *Attorney, Agent, or Firm*—Cesari and McKenna, LLP

(57) ABSTRACT

A mechanism for reprioritizing high-latency input/output operations in a file system is provided. The mechanism expands a file access protocol, such as the direct access file system protocol, by including a hurry up command that adjusts the latency of a given input/output operation. The hurry up command can be employed in the Direct Access File System.

20 Claims, 7 Drawing Sheets

SYSTEM AND METHOD FOR REPRIORITIZING HIGH-LATENCY INPUT/OUTPUT OPERATIONS

CROSS-REFERENCE TO RELATED APPLICATION

The present application is a divisional of U.S. patent application Ser. No. 10/171,140, which was filed on Jun. 13, 2002 now abandoned, by Matthew S. DeBergalis, et al for a SYSTEM AND METHOD FOR REPRIORITIZING HIGH-LATENCY INPUT/OUTPUT OPERATIONS and is hereby incorporated by reference.

FIELD OF THE INVENTION

The present invention relates to file system operations and, more specifically to modifying the priority of a high-latency input/output operation.

BACKGROUND OF THE INVENTION

A file server is a computer that provides file service relating to the organization of information on writeable persistent storage devices, such as non-volatile memories, tapes or disks. The file server or filer may be embodied as a storage system including a storage operating system that implements a file system to logically organize the information as a hierarchical structure of directories and files on, e.g. the disks. Each "on-disk" file may be implemented as a set of data structures, e.g. disk blocks, configured to store information, such as the actual data for the file. A directory, on the other hand, may be implemented as a specially formatted file in which information about other files and directories are stored.

A filer may be further configured to operate according to a client/server model of information delivery to thereby allow many client systems (clients) to access shared resources, such as files, stored on a server, e.g. the filer. In this model, the client may comprise an application, such as a database management system (DBMS), executing on a computer that "connects" to the filer over a computer network, such as a point-to-point link, a local area network (LAN), a wide area network (WAN) or a virtual private network (VPN) implemented over a public network, such as the Internet. Each client may request the services of the filer by issuing file system protocol messages (in the form of packets) to the filer over the network. By supporting a plurality of file system protocols, such as the Network File Service version 4 (NFSv4) and the Direct Access File System (DAFS) protocols, the utility of the filer may be enhanced for networking clients.

Typical clients of a file server desire the lowest possible latency of input/output operations. As used herein, the term "latency" generally means the time between when the client sends a specific I/O operation request and the time when the client receives an acknowledgement that a file server has completed the requested operation. With reference to read operations, the latency is normally the time from when the client transmits a read operation until the time when the client receives the requested data. Similarly, for a write operation, latency is the time between the client sending the write operation until the time when the client receives an acknowledgement that the file server has committed the data to some form of persistent storage.

To reduce the latency of write operations, many file servers provide for some form of journaling wherein data to be written to disk is first copied to a persistent media, non-volatile random access memory (NVRAM) or flash RAM, before writing the data to disk. The file server can send an acknowledgement of the write operation once the data has been committed to persistent storage. As NVRAM or flash RAM is typically many orders of magnitude faster than writing data to disk, a file server can acknowledge a write operation sooner, thereby reducing the latency of the write operation request—that is, the time needed to complete the request and commit it to persistent storage. The data that has been acknowledged is later written to disk at regular intervals when the file system flushes its memory buffers. In the example of a Write Anywhere File Layout (WAFL) file system (such as that available from Network Appliance, Inc. of Sunnyvale, Calif.), the flushing occurs during consistency points where the file system generates a consistent on-disk image of the file system. Typically, during this write operation, the data is copied from volatile memory (online system RAM) to disk. If a crash or other error condition occurs, the data can be recovered from the NVRAM or other persistent storage.

The writing and copying of data to the NVRAM or other forms of persistent storage entails an additional consumption of file server processing resources and time. However, this consumption of resources is necessitated to meet the low-latency expectations of clients. In general, many common data handling functions within the server environment dictate a low-latency approach so that the data is persistently committed and otherwise available to users as soon as possible.

Nevertheless, there are a variety of types of applications and/or bulk data operations that can tolerate a relatively high-latency for input/output (I/O) operations. In other words commitment of certain data to persistent storage is less time-dependent. An example of such applications are the "page cleaning" write operations for a database (in which pages which have been stored by the database server are written to disk), the swapping of virtual memory for operating systems, and lazy write operations where data is buffered and then written to disk when appropriate processing resources are otherwise free to do so. These types of applications are bandwidth sensitive, so as long as they can keep many outstanding I/O operations pending simultaneously, the latency of each individual operation is less important. When the I/O operations can tolerate a high-latency, several file systems allow a write operation to include a specified latency for that particular request. If the designated latency is high enough, the file server need not commit the write data to persistent storage disk (disk, NVRAM, etc.) until the requested latency period has expired. Once the acceptable window of time has passed, it must commit the data to persistent storage (typically NVRAM) and send an acknowledgment to the client. If the designated latency is high enough, however, a file server may begin a consistency point before the window expires. In this case, there is no need to first commit the write data to NVRAM; it can be written directly to disk, saving the CPU time and memory bandwidth of writing to NVRAM. When the data is flushed, that data stored in the volatile memory is written to the disk, and the I/O operation is then acknowledged back to the client. While the data is stored in volatile storage, no acknowledgement is made, and the client logs the existence of an outstanding I/O request to the server. Some file system protocols, like NFS, support UNSTABLE writes, which also obviate the need for NVRAM copies. But, these writes must be tracked by the client and explicitly committed using a COMMIT message. DAFS high-latency writes require no such action by the client. The client must be prepared to retransmit unstable requests to the server if the server suffers an error condition before committing the data to disk.

A flow diagram showing an I/O operational environment 100 for the two general types of I/O write operations (high and low-latency) is shown in FIG. 1. The environment 100 includes a main memory 110, an NVRAM 115 and a disk 120. In a conventional write operation 125, a set of requested data 130 is initially placed in the main memory 110 by an appropriate request operation. The storage operating system executing on the file server also copies the data 130 to the NVRAM 115 thereby committing it to persistent storage. The copying to the NVRAM typically occurs substantially simultaneously with the placement of the data in the main memory 110. Once the data 130 is copied to the NVRAM 115, an acknowledgement is sent to the client that originated the write request. At some later time (i.e. a consistency point), the file system flushes the data stored in its buffers in the main memory to disk 120. As the write operation was already acknowledged, the client is able to continue operating without waiting for the data to be written to disk.

When a high-latency write operation (as described generally above) 135 is executed, the data 140 is written to the main memory 110. The data 140 remains in the main memory until such time as a consistency point, or other operation to flush the buffers of main memory, occurs. At such a consistency point, the data 140 is then copied to disk 120. After the data has been copied to disk, an acknowledgement is sent to the originator of the write operation.

One example of a file system protocol that generally supports high-latency operations is the Direct Access File System (DAFS) protocol. The DAFS protocol is a file access and management protocol designed for local file sharing or clustered environments. This distributed file system protocol provides low latency, high throughput and low overhead data movement that takes advantage of memory-to-memory networking technologies. The DAFS protocol, in particular, supports a command entitled DAFS_PROC_BATCH_SUBMIT that initiates a set of I/O requests to and from regular files. The DAFS_PROC_BATCH_SUBMIT operation permits a client to bundle a group of input/output requests into a single operation, which reduces processing overhead in generating DAFS data structure packets. The DAFS server performs the bundled requests and then sends an acknowledgement of the requests. An example of the data structures sent as part of the DAFS_PROC_BATCH_SUBMIT operation is shown in FIG. 2. The data structure 200 includes fields for requests 205, latency 210, number of completions 215, a synchronous flag, and, in alternate embodiments, other fields 225. The requests array 205, contains pointers to the various I/O requests that have been bundled together for the batch I/O operation. The maximum latency field 210 identifies a number of microseconds that the client is willing to wait for an acknowledgment of the operations. Under the DAFS protocol, the file server is not obligated to respond within the time frame set in the maximum latency 210 field. However, traditional server implementations will attempt to acknowledge I/O requests as soon as possible if the maximum latency is under a given amount, for example, 5 seconds.

In certain instances, a client's activities are blocked due to the presence of an outstanding high-latency I/O request. This blocking effect can occur when, for example, data that is in a high-latency write operation must be read or otherwise modified. In such cases, the client cannot continue with its normal operation until the high-latency I/O request has been acknowledged using known file server implementations. In one example, the latency may extend for a time period up to the maximum time set in a predetermined protocol latency field (e.g., 30 seconds). Until the I/O request is acknowledged, the client may effectively cease processing as it awaits acknowledgement of the write operation. Such processing delays can eliminate any server performance gains of doing high latency I/O. It would thus be advantageous to enable a client of a file server to modify the maximum latency to expedite or "hurry up" the execution of a certain I/O request. By permitting a client to expedite a command, a client can, if the client reaches a point where it is blocked from a further processing until a command is executed, hurry up the execution of the command and thereby avoid being blocked. If a client can modify the original maximum latency of a given I/O operation, then the client can expedite those commands that may normally cause the client's processing (until the command is executed). However, known file system implementations lack the functionality to permit a client to modify the latency of a given I/O operation.

SUMMARY OF THE INVENTION

The invention comprises a mechanism for reprioritizing high-latency input/output operations using a file system protocol. The mechanism extends the file system protocol by specifying a hurry-up operation that modifies the maximum latency associated with a given input/output operation. The invention thus provides support at the file system level for the modification of a previously maximum latency associated with an I/O operation.

In the illustrative embodiment, the file system protocol is the Direct Access File System (DAFS) protocol employed by clients of a file server to perform input/output operations. Specifically, clients who have previously issued I/O operations that specify a high-latency may utilize the novel hurry up operation to reduce the latency of the request.

A client who has previously issued a high-latency I/O operation may need to modify the latency of that command. This need to modify the latency of the command can arise, for example, when an application executing on a client requires the completion of the I/O request before it can continue processing. The client sends the hurry up command along with a data structure identifying the request that should be expedited. Upon receipt of the hurry up command and data structure, a file server will, in the illustrative embodiment, modify the maximum latency field in the request to zero, which causes this file system layer of the storage operating system of the file system to copy the outstanding operation to some form of persistent memory as soon as possible. The operation is then acknowledged as soon as it is stored in persistent memory. In alternate embodiments, the data structure associated with the hurry up operation may include a new maximum latency, which would be used by the file system layer to change the latency field of a given operation. Thus, it would be possible for a client to both increase or decrease the outstanding latency of a given input/output operation.

BRIEF DESCRIPTION OF THE DRAWINGS

The above and further advantages of invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Storage System Environment

Figure 1:
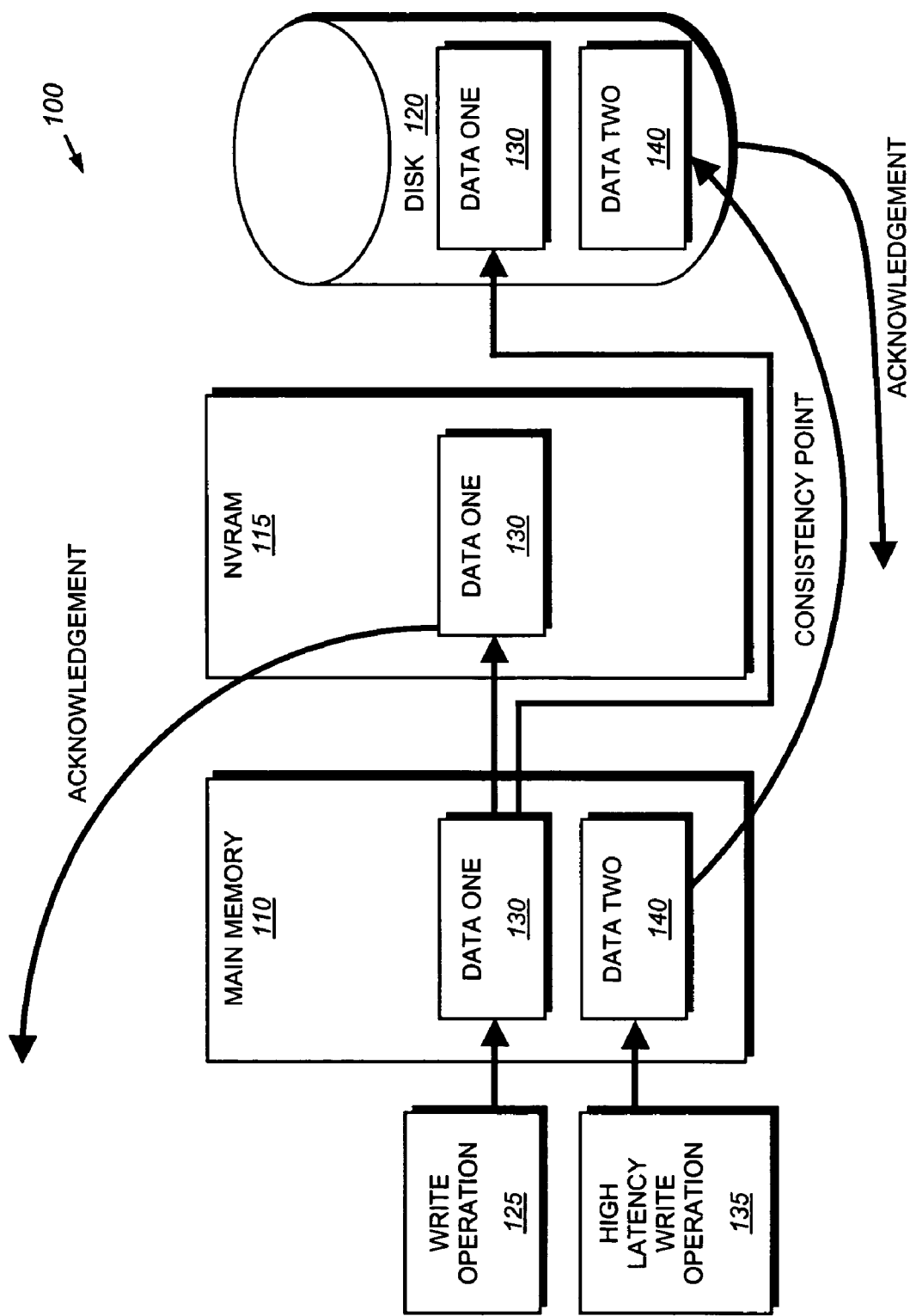
FIG. 1, already described is a flow diagram showing the steps followed during a write operation and a high-latency write operation.
Figure 2:
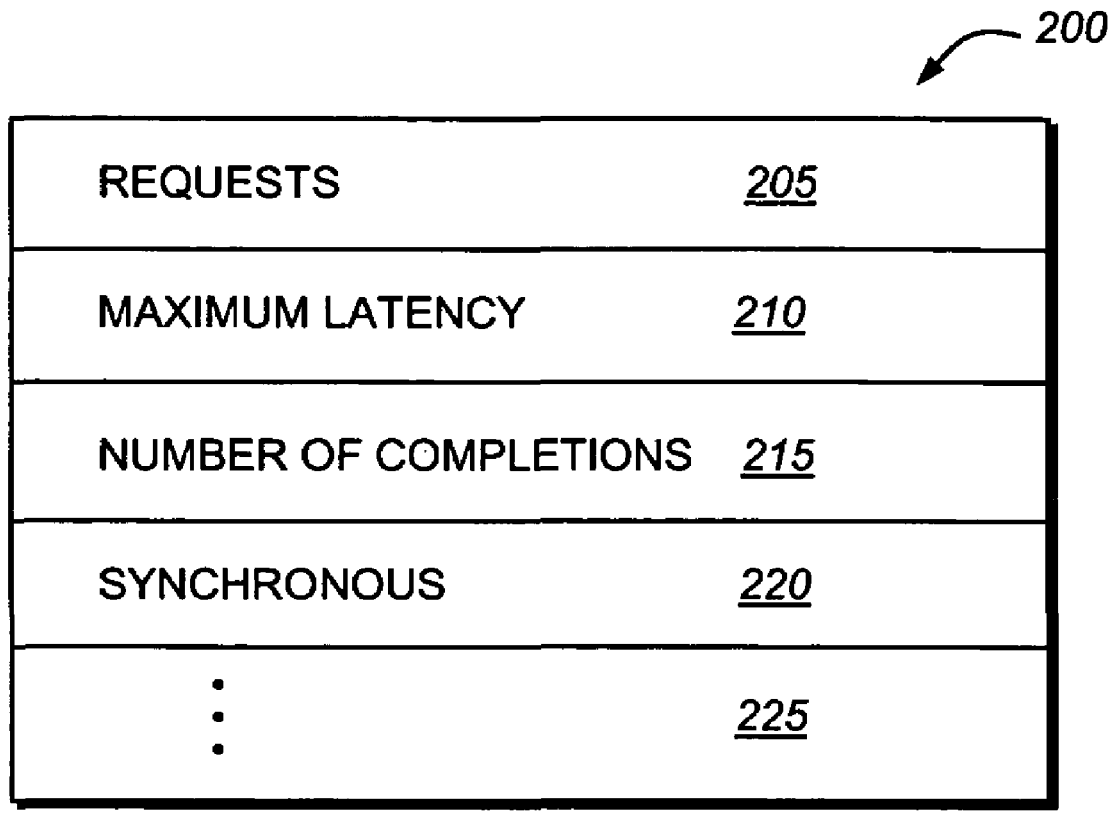
FIG. 2, already described, is a data structure associated with a DAFS batch input/output operation in accordance with an embodiment of the present invention.
Figure 3:
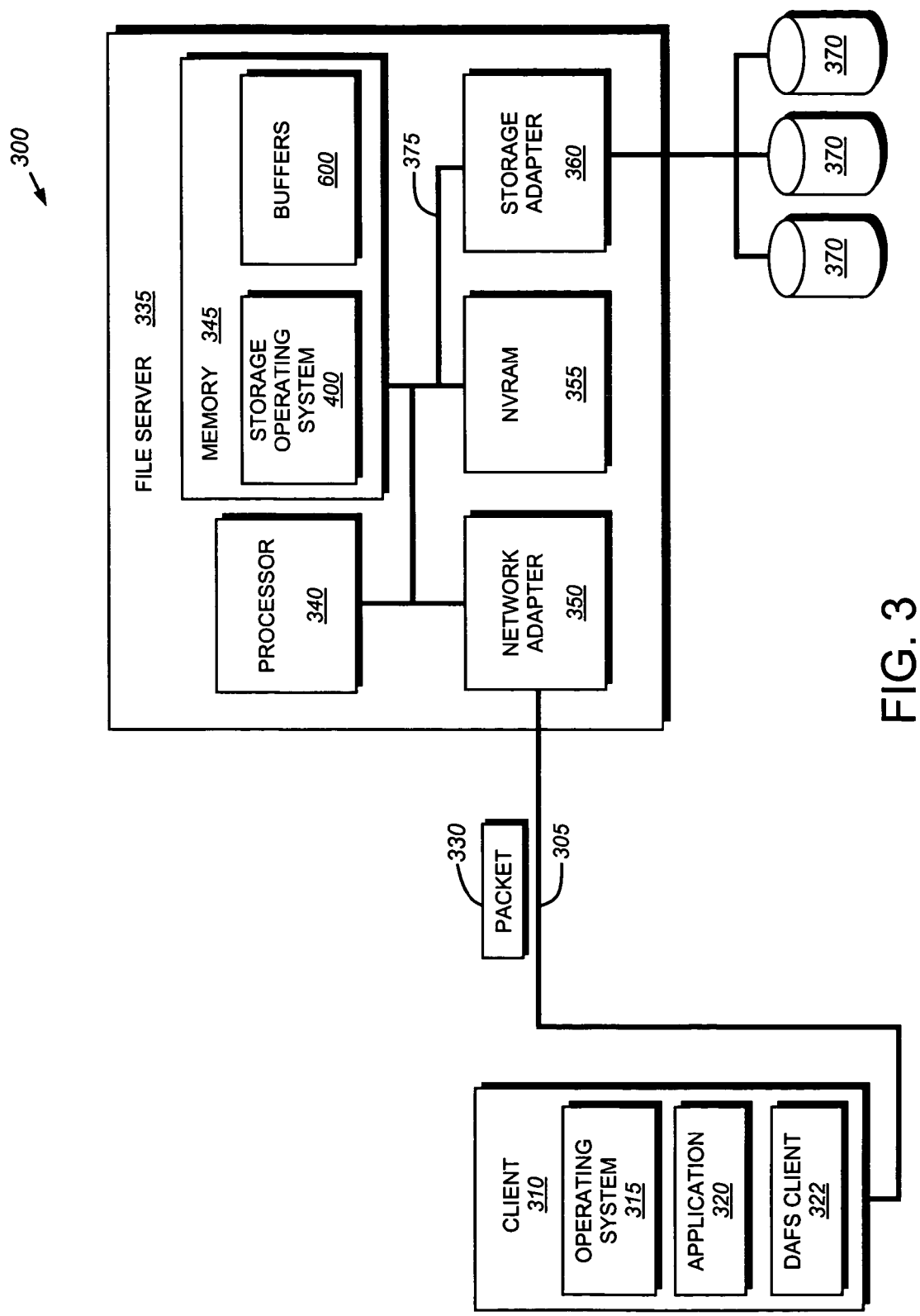
FIG. 3 is a schematic block diagram of an exemplary file server environment in accordance with an embodiment of the invention.

FIG. 3 is a schematic block diagram of a storage system environment 300 that includes a plurality of clients 310 having an operating system 315 and one or more applications 320, a Direct Access File System (DAFS) client 325 and an interconnected file server 335 that may be advantageously used with the present invention. The filer server or "filer" 335 is a computer that provides file service relating to the organization of information on storage devices, such as disks 370. It will be understood to those skilled in the art that the inventive technique described herein may apply to any type of special-purpose computer (e.g., server) or general-purpose computer, including a standalone computer. The filer 335 comprises a processor 340, a memory 345, a network adapter 350 and a storage adapter 360 interconnected by a system bus 375. The filer 335 also includes a storage operating system 400 located in memory 345 that implements a file system to logically organize the information as a hierarchical structure of directories and files on the disks. The memory 345 also includes a set of buffers 600 allocated to store data before it is written to disk (370).

It will be understood to those skilled in the art that the inventive technique described herein may apply to any type of special-purpose computer (e.g., file serving appliance) or general-purpose computer, including a standalone computer, embodied as a storage system. To that end, filer 335 can be broadly, and alternatively, referred to as storage system. Moreover, the teachings of this invention can be adapted to a variety of storage system architectures including, but not limited to, a network-attached storage environment, a storage area network or a disk assembly directly-attached to a client/host computer. It should be noted that the file system protocol can also include disk access protocols, such as the Small Computer System Interface (SCSI) protocol. Furthermore, the file system layer may be broadly defined as any storage functionality that translates, however trivially, operation requests to their data location in some form of stable storage. In addition, it would be apparent to those skilled in the art that the inventive mechanism described herein may apply to any type of special-purpose (e.g., file serving application) or general-purpose computer, including a stand alone computer or portion thereof, embodied as or including a storage system.

The clients 310 and filer 335 of computer network 305 are preferably organized in a client/server environment. Each client includes an operating system 315, one or more applications 320 and, in the illustrative embodiment, Direct Access File System (DAFS) client functionality 325. The DAFS client functionality can be implemented by, e.g., software executing within the operating system and coordinating with an appropriate network interface controller (not shown). Moreover, the teachings of this invention can be adapted to a variety of storage system architectures, including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

In the illustrative embodiment, the memory 345 comprises storage locations that is are addressable by the processor and adapters for storing software program code. The memory comprises a form of random access memory (RAM) that is generally cleared by a power cycle or other reboot operation (e.g. it is a "volatile" memory). The processor and adapters may, in turn, comprise processing elements and/or logic circuitry configured to execute the software code and manipulate the data structures. The storage operating system 400, portions of which are typically resident in memory and executed by the processing elements, functionally organizes the filer by, inter alia, invoking storage operations in support of a file service implemented by the filer. Included within the storage operating system 400 is support for a DAFS server, described further below. It will be apparent to those skilled in the art that other processing and memory means, including various computer readable media, may be used for storing and executing program instructions pertaining to the inventive technique described herein.

The network adapter 350 comprises the mechanical, electrical and signaling circuitry needed to connect the filer 335 to a client 310 over a computer network 305, which may comprise a point-to-point connection or a shared medium, such as a local area network. The client 310 may be a general-purpose computer configured to execute applications 320, such as a Database Management System (DBMS) application. Moreover, the client 310 may interact with the filer 335 in accordance with a client/server model of information delivery. That is, the client may request the services of the filer, and the filer may return the results of the services requested by the client, by exchanging packets 330 encapsulating, e.g., the DAFS protocol format over the network 305. The format of DAFS protocol packets exchanged over the network is well-known and described in *DAFS: Direct Access File System Protocol, Version* 1.0, by Network Appliance, Inc. dated Sep. 1, 2001, which is hereby incorporated by reference.

The storage adapter 360 cooperates with the operating system 400 executing on the filer to access information requested by the client. The information may be stored on the disks 370 of a disk array that is attached, via the storage adapter 360 to the filer 335 or other node of a storage system as defined herein. The storage adapter 360 includes input/output (I/O) interface circuitry that couples to the disks over an I/O interconnect arrangement, such as a conventional high-performance, Fibre Channel serial link topology. The information is retrieved by the storage adapter and, if necessary, processed by the processor 340 (or the adapter 360 itself) prior to being forwarded over the system bus 375 to the network adapter 350, where the information is formatted into a packet and returned to the client 310.

In one exemplary filer implementation, the filer 335 can include a nonvolatile random access memory (NVRAM) 355 that provides fault-tolerant backup of data, enabling the integrity of filer transactions to survive a service interruption based upon a power failure, or other fault. The size of the NVRAM depends in part upon its implementation and function in the file server. It is typically sized sufficiently to log a certain amount of written data (for example, 64 MB). The NVRAM is filled, in parallel with the memory as described above, after each non-high-latency client request is completed, but before the result of the request is returned to the requesting client.

B. Storage Operating System

To facilitate generalized access to the disks 370, the storage operating system 400 (FIG. 3) implements a write-anywhere file system that logically organizes the information as a hierarchical structure of directories and files on the disks. Each "on-disk" file may be implemented as a set of disk blocks configured to store information, such as data, whereas the directory may be implemented as a specially formatted file in which other files and directories are stored. As noted above, in the illustrative embodiment described herein, the operating system is the NetApp® Data ONTAP™ operating system available from Network Appliance, Inc., that implements the Write Anywhere File Layout (WAFL™) file system. It is expressly contemplated that any appropriate file system can be used, and as such, where the term "WAFL" is employed, it should be taken broadly to refer to any file system that is otherwise adaptable to the teachings of this invention.

Again to summarize, as used herein, the term "storage operating system" generally refers to the computer-executable code operable on a storage system that implements file system semantics and manages data access and, in the case of a filer. In this sense, Data ONTAP™ software is an example of such a storage operating system implemented as a kernel. The storage operating system can also be implemented as an application program operating over a general-purpose operating system, such as UNIX® or Windows NT®, or as a general-purpose operating system with configurable functionality, which is configured for storage applications as described herein.

Figure 4:
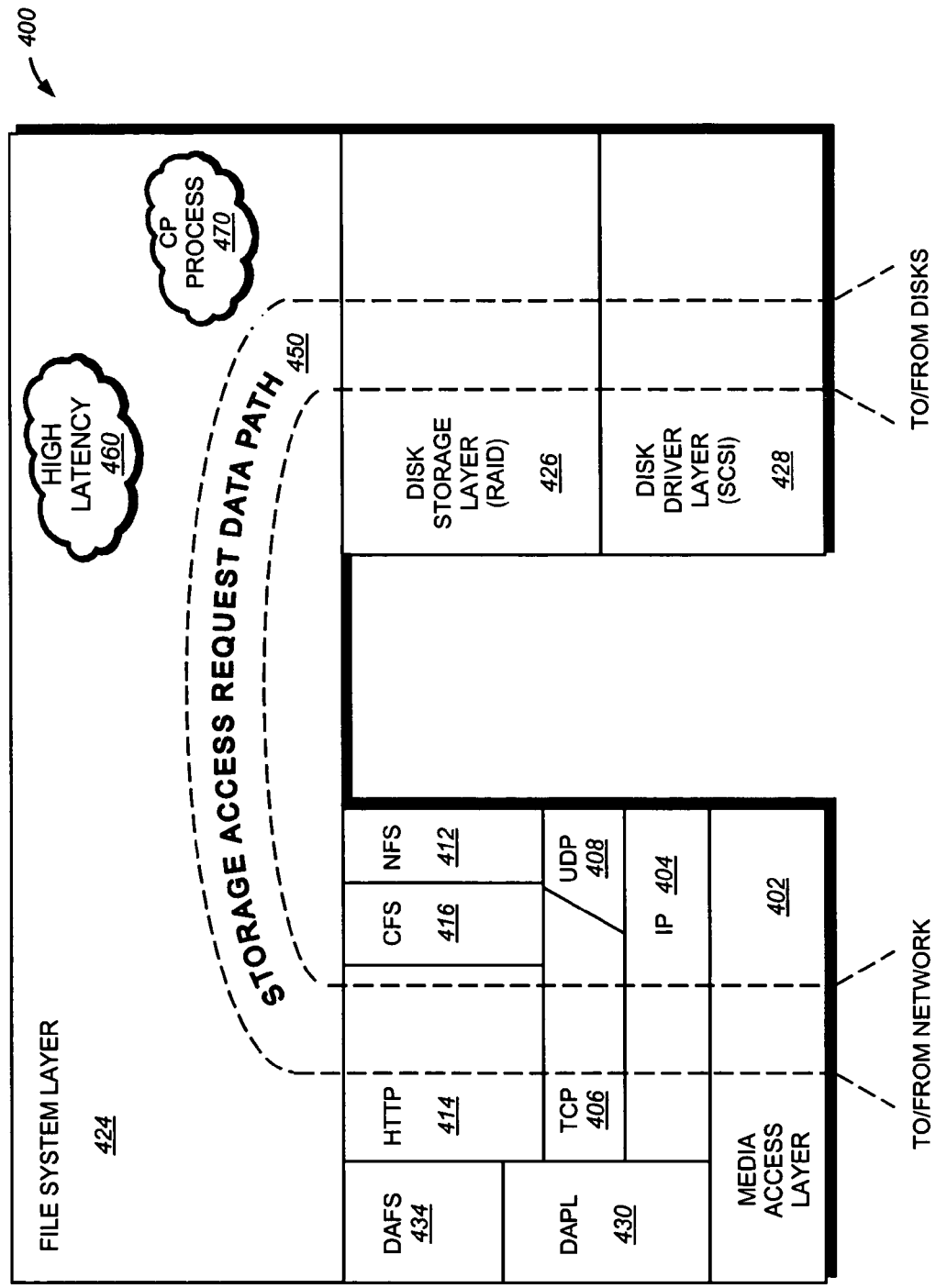
FIG. 4 is a schematic block of a storage operating system for use with a file server of FIG. 3 in accordance with an embodiment of the present invention.

The organization of the preferred storage operating system for the exemplary filer is now described briefly. However, it is expressly contemplated that the principles of this invention can be implemented using a variety of alternate storage operating system architectures. As shown in FIG. 4, the storage operating system 400 comprises a series of software layers, including a media access layer 402 of network drivers (e.g., an Ethernet driver). The operating system further includes network protocol layers, such as the Internet Protocol (IP) layer 404 and its supporting transport mechanisms, the Transport Control Protocol (TCP) layer 406 and the User Datagram Protocol (UDP) layer 408.

Additionally the storage operating system includes a User Direct Access Programming Library (DAPL) 430, which implements the virtual interface (VI) architecture DAPL is described in *uDAPL: User Direct Access Programming Library*, Version 0.91, published by the DAT Collaborative, which is hereby incorporated by reference. The architecture for the virtual interface (VI) is defined in *Virtual Interface Architecture Specification, Version* 1.0, published in collaboration between Compaq Computer Corporation, Intel Corporation and Microsoft Corporation, which is hereby incorporated by reference. This DAPL layer 430 provides the direct access transport capabilities required by the Direct Access File System. The DAPL layer 430 should be taken as exemplary only. Any other suitable transport protocol that can accommodate the DAFS protocol can be utilized including, for example, InfiniBand™.

A file system protocol layer provides multi-protocol data access and, to that end, includes support for the Common Internet File System (CIFS) protocol 416, the Network File System (NFS) protocol 412, the Hypertext Transfer Protocol (HTTP) protocol 414 and the Direct Access File System (DAFS) protocol 434. The DAFS layer 434 enables the file server executing the storage operating system 400 to process DAFS requests from clients 310 acting as DAFS clients 325.

In addition, the storage operating system 400 includes a disk storage layer 420 that implements a disk storage protocol, such as a the Redundant Array of Independent Disk (RAID) protocol, and a disk driver layer 428 that implements a disk access protocol such as, e.g., a Small Computer Systems Interface (SCSI) protocol.

Bridging the disk software layers with the network and file system protocol layers is a file system layer 424 of the storage operating system 400. The file system layer 424 implements a file system having an on-disk format representation that is block-based using, e.g., 4-kilobyte (kB) data blocks and using inodes to describe the files. In response to transaction requests, the file system generates operations to load (retrieve) the requested data from disks 370 if it is not resident "in-core", i.e., in the filer's memory 345. If the information is not in memory, the file system layer 425 indexes into the inode file using the inode number to access an appropriate entry and retrieve a logical volume block number. The file system layer 424 then passes the logical volume block number to the disk storage (RAID) layer 426, which maps that logical number to a disk block number and sends the latter to an appropriate driver (for example, an encapsulation of SCSI implemented on a fibre channel disk interconnection) of the disk driver layer 428. The disk driver accesses the disk block number from disks 370 and loads the requested data in memory 345 for processing by the filer 335. Upon completion of the request, the filer (and storage operating system) returns a reply, e.g., a conventional acknowledgement packet defined by the DAFS specification, to the client 310 over the network 305.

It should be noted that the software "path" 450 through the storage operating system layers described above needed to perform data storage access for the client request received at the filer may alternatively be implemented in hardware or a combination of hardware and software. That is, in an alternate embodiment of the invention, the storage access request data path 450 may be implemented as logic circuitry embodied within a field programmable gate array (FPGA) or an application specific integrated circuit (ASIC). This type of hardware implementation increases the performance of the file service provided by filer 335 in response to a file system request packet 325 issued by client 310.

Additionally, within the file system layer 424 is a consistency point (CP) process 470 and a set of high latency processes 460. These CP process 470 handles write allocation for the file system by generating, at regular intervals or when NVRAM is full, a consistency point at which a stable on-disk image of the file system is generated. The high latency processes 460 track high-latency I/O requests and handle reprioritization of such requests as described further below.

C. Reprioritization of High-Latency I/O Operations

The present invention comprises a mechanism for reprioritizing high-latency I/O operations in a file system protocol. In particular, the mechanism extends the file system protocol by specifying a hurry up operation that modifies the maximum latency of an I/O operation. In the illustrative embodiment, the hurry up operation modifies the maximum latency of a given I/O operation to zero, which notifies the file server to commit the data to persistent memory as soon as possible and acknowledge the I/O request. More particularly, a client may need to modify the latency of an I/O operation when, for example, an application executing on the client requires completion of the I/O request before it can continue processing. A client may initially set the latency of a given I/O operation request based upon a variety of factors. An exemplary factor would be setting the latency period to a value so that a consistency point will occur before the latency time expires. Conversely, the set latency cannot be too great a value, otherwise, the client may not be able to queue enough I/O operation requests. For example, a two minute latency would require that a client have over two minutes of queued I/O operations for a real savings in system performance to be noticed.

Figure 5:
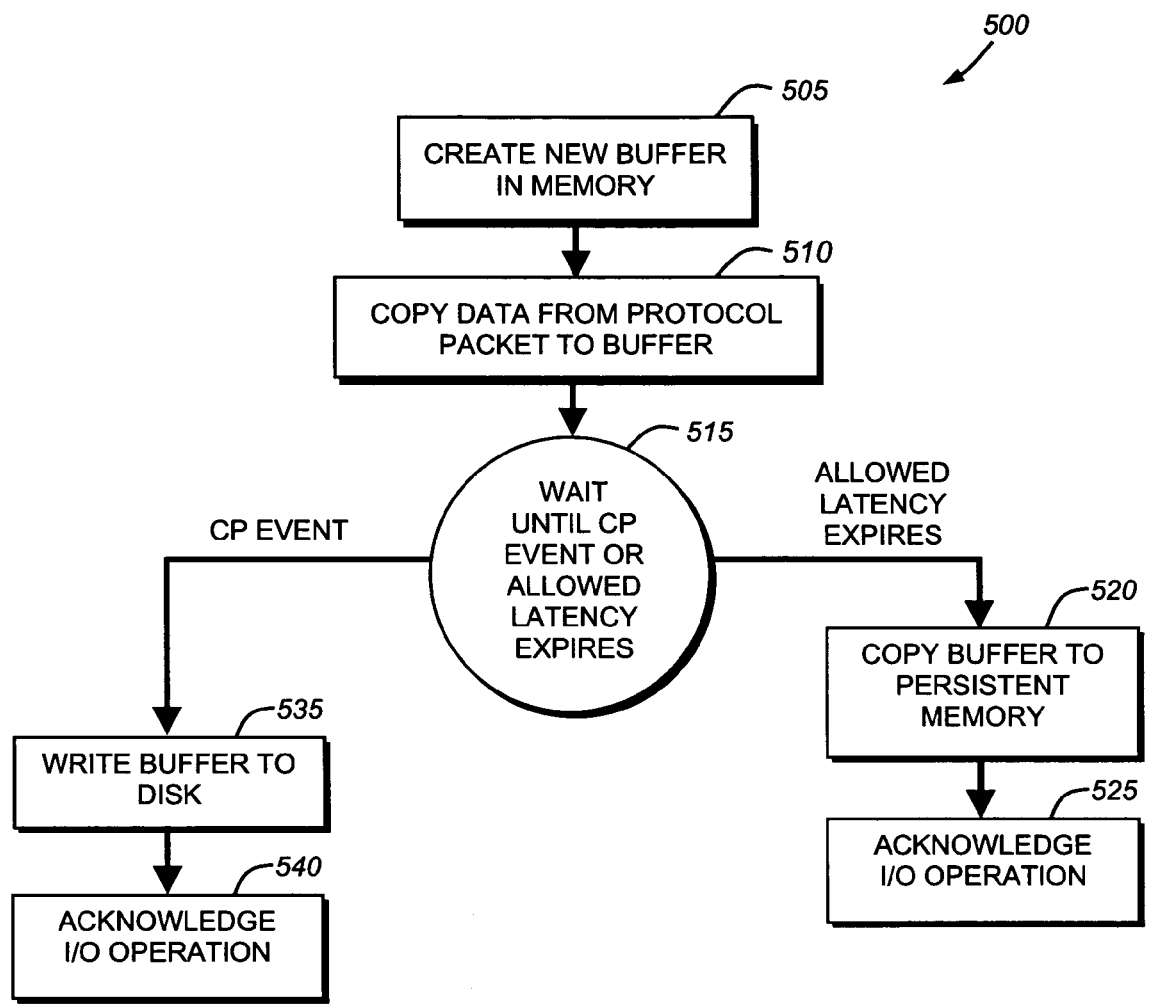
FIG. 5 is a flow chart detailing the steps of a procedure performed by the file system layer of the storage operating system in handling input/output operations.

The steps of the procedure performed by the file system layer when receiving a new I/O request is shown in FIG. 5. Initially, in step 505, a new buffer is created in the memory of the file server. A buffer is a storage unit in memory for holding I/O requests and data before they are committed to persistent storage. Next, in step 510, the data contained in the file system protocol packet is copied from the packet to the buffer. In the illustrative embodiment, the data would include the data to be written to the disks in accordance with a batch write operation wherein numerous write operations are bundled into one write operation packet. The use of batch I/O saves the processing overhead in generating multiple write headers and packets. Once the data has been copied to the buffer in memory, the system adds this request to a list of pending requests. Periodically, this list is checked for any items whose latency window has expired. If the window expired, the procedure copies the contents of the buffer to some form of persistent memory in step 520. This persistent memory can include NVRAM, or directly copying the data to disk. After the buffer has been copied to some form of persistent memory, then the I/O operation is then acknowledged in step 525.

If a consistent point occurs before the latency window of an I/O operation expires, the contents of the buffer in main memory are written to disk in step 535. Once the buffer is written to disk as part of the CP operation, the I/O operation is acknowledged in step 540. It should be noted that while this description is written in terms of consistency points, any form of journaling technique, in which a consistent image of the data is generated on a persistent storage device, can be employed within the confines of the present invention.

Additionally, it should be noted that differing processes or threads within the storage operating system can perform the various steps of procedure 500. For example, one process may perform steps 505 and 510, a second performs steps 520 and 525 and a third performs 535 and 540. However, it should be noted that, in alternate embodiments, all of the functionality may be performed by a single process.

Figure 6:
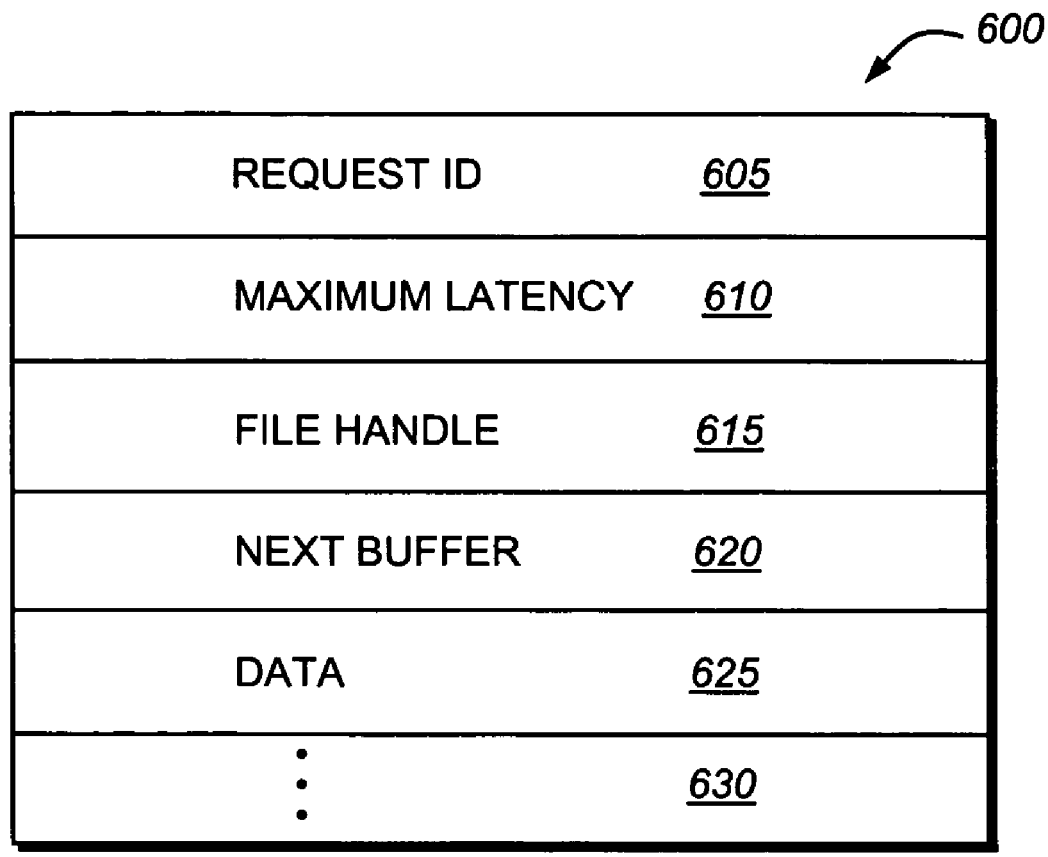
FIG. 6 is a schematic block diagram of a buffer stored in the memory of a file server in accordance with an embodiment of the present invention.

While in the file server's memory, the various requests are stored in buffers. An exemplary data structure associated with a buffer 600 is shown in FIG. 6. The data structure 600 includes fields for the request identifier 605, a maximum latency 610, a file handle 615 (e.g., a data structure that stores information related to a file such as a pathname), a pointer to a next buffer 620, a field for data 625, and in alternate embodiments, additional fields 630. The request identifier 605 is a unique number identifying the particular I/O request which generated the data stored in this buffer. The latency 610 is the time (in seconds) that the client has indicated it is willing to wait for an acknowledgement. The file handle 615 is a traditional file system file handle that points to the file that the data is to be written to or from and contains other attributes that are associated with the file. The next buffer pointer 620 allows the file system layer to generate a linked list to these buffers.

Figure 7:
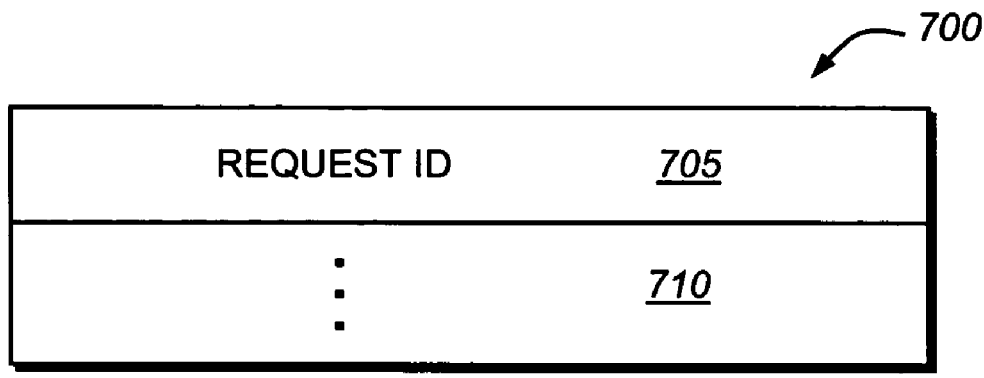
FIG. 7 is a schematic block diagram of a file system data structures used in conjunction with a hurry up operation in accordance with an embodiment of the present invention.

FIG. 7 is a schematic block diagram illustrating a data structure 700 used by a client as an argument to the novel hurry up command in accordance with the present invention. In the illustrative embodiment, the hurry up functionality is created within a new command incorporated into the DAFS protocol. The argument data structure includes an entry describing the request identifier 705 and, in alternate embodiments additional fields 710. The request identifier 705 identifies the particular request that is to be expedited. When the file system layer receives the hurry up command, the file system layer will locate in the buffer associated with the request identifier 705. In certain alternate embodiments the additional fields 710 can include an alternative latency field. This alternate latency field can allow a client to specify an alternate maximum latency for a given request, thereby modifying the latency of the request (e.g., from 10 seconds to 1 seconds).

Figure 8:
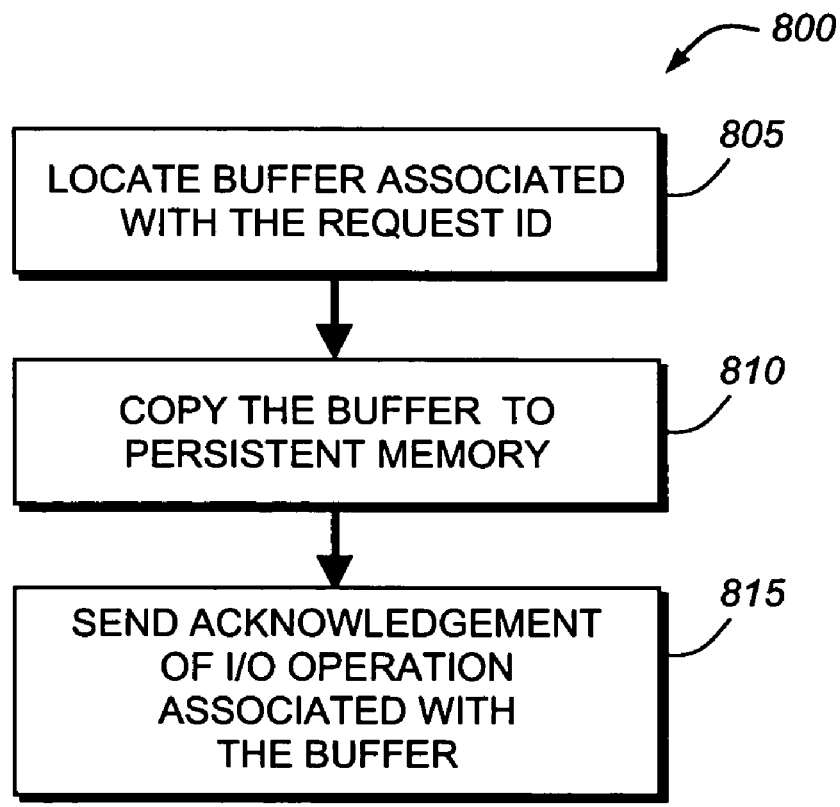
FIG. 8 is a flow chart detailing the steps of a procedure performed by the file system layer of a storage operating system in response to the receipt of the hurry up operation.

The procedure 800 performed by the high-latency processes within the file system layer of the storage operating system is shown in FIG. 8. Upon receipt of the hurry up operation, the process locates the buffer associated with the request identifier of the data structure 700 used as an argument of the hurry up command (step 805). The located buffer is then copied to some form of persistent memory in step 810. Again, the persistent memory may include NVRAM or, in alternate embodiments, a direct copy of the data to disk. Once the contents of the buffer has been copied to some form of persistent memory, and acknowledgement of the I/O operation associated with the buffer is then sent to the client which originated the operation in step 815.

To again summarize, the present invention provides a mechanism for reprioritizing high-latency input/output operations using a file system protocol. In a specific embodiment, the mechanism extends the DAFS protocol to include a hurry up operation that modifies the maximum latency associated with a given I/O operation. A client can utilize the novel hurry up command to expedite the handling of a given I/O operation. Specifically, in the illustrative embodiment the client sends a hurry up command containing a data structure containing a request identifier that is associated with a previously sent high-latency operation request. The file system layer and its high-latency processes will modify the latency of the identified request so that, in the illustrative embodiment, it is written to persistent storage and acknowledged as soon as possible. In alternate embodiments, the data structure can include an alternate latency field. In such alternate embodiments, the high-latency processes modify the maximum latency of the identified request with the alternate latency.

The present invention, thus, permits clients to modify the latency of a given I/O operation in known file system implementations that include high and low latency operations. This permits certain clients which can become blocked or otherwise incapable of further processing in certain situations when they require the results of a certain I/O operation, reprioritize an I/O operation to expedite the completion of the operation. A file server upon receipt of a reprioritization request, will, in the illustrative embodiment attempt to immediately write the I/O operation to persistent storage, thereby enabling the file system to transmit the needed acknowledgement of the I/O request to the client.

The foregoing has been a detailed description of the illustrative embodiment of the invention. Various modifications and additions can be made without departing from the spirit and scope of the invention. For example, it is understood that the various data structures can include additional information while remaining within the scope of the pre-sent invention. By using the above-described novel system and method, file servers can improve system performance by eliminating unnecessary NVRAM copies, while avoiding the possible blocking of a client due to an unexecuted high latency I/O operation. While this description has been written with reference to the DAFS protocol, it should be noted that the principles of the invention apply to any distributed access file system protocol. Further, it is expressly contemplated that the teachings of this invention can be implemented as software, including a computer-readable medium having program instructions executing on a computer, hardware, firmware, or a combination thereof. Accordingly this description is to be taken only by way of example and not to otherwise limit the scope of the invention.

What is claimed is:

1. A file server, comprising:
a maximum protocol latency time for a high latency input/output function, the maximum protocol latency time set through an operating system;
a high latency input/output request received by a file system layer, a maximum latency time for the request controlled by the maximum protocol latency time;
a hurry-up command received by the file system layer, the hurry-up command modifying the maximum latency time for the request; and
a high-latency input/output function adapted to enable, in response to the modifying the maximum latency time for the request, reprioritizing the high-latency input/output request to a lower latency.

2. The server of claim 1, further comprising:
a client of the file server utilizing a direct access file system to execute the request.

3. The server of claim 1, further comprising:
the file system layer to process the input/output request at the lower latency.

4. The server of claim 1, further comprising:
a client to transmit a data structure to the high-latency input/output function identifying the input/output request to be modified.

5. The server of claim 4, further comprising:
the data structure has a request ID field and an alternative latency field.

6. A method for controlling latency of execution of input/output requests in a server, the method comprising the steps of:
setting a maximum protocol latency time for a high latency input/output function;
receiving a high latency input/output request by a file system layer, a maximum latency time for the request controlled by the maximum protocol latency time;
receiving a hurry-up command by the file system layer, the hurry-up command modifying the maximum latency time for the request; and
executing, in response to the modifying the maximum latency time for the request, the input/output operation with a latency associated with the maximum latency time for the request.

7. The method of claim 6, further comprising:
associating a latency indicator with an execution priority relative to other pending input/output operations and the executing step executes the input/output operation responsive to the associated execution priority.

8. The method of claim 6, further comprising:
changing a latency indicator to a selected value associated with a relative lower latency execution from a value associated with a relatively higher latency execution.

9. The method of claim 6, further comprising:
changing a latency indicator to a value under a preselected threshold associated with input/output operations requiring relatively low-latency execution.

10. The method of claim 9, further comprising:
dynamically setting the threshold depending on queued input/output requests.

11. The method of claim 9, further comprising:
setting the threshold is set dependent on the identity of the client.

12. The method of claim 9, further comprising:
placing the latency indicator in a field in the request.

13. The method of claim 6, further comprising:
specifying-a time within which execution of the input/output request is requested.

14. The method of claim 6, further comprising:
receiving the latency control command from a client subsequent to receipt of the input/output request.

15. A method for a client to modify an input/output operation's latency, the method comprising the steps of:
sending the input/output operation request to a computer, the request including a data structure, the data structure including a maximum latency value;
sending a latency control command identify the input/output operation and a new latency value to the computer;
changing, in response to the latency control command, a latency indicator associated with an input/output operation specified by the new latency value; and
executing, in response to the changing the latency indicator, the input/output operation with a latency associated with the latency indicator.

16. The method of claim 15 wherein the latency control command includes a request ID field to identify the input/output operation.

17. The method of claim 16 wherein the latency control command includes an alternative latency field to identify the new latency value.

18. The method of claim 16 wherein the latency indicator is associated with an execution priority relative to other pending input/output operations and the executing step executes the input/output operation responsive to the associated execution priority.

19. The method of claim 16 wherein the step of changing a latency indicator further comprises the step of changing the latency indicator to a selected value associated with a relative lower latency execution from a value associated with a relatively higher latency execution.

20. The method of claim 16 wherein the latency control command is received from the client subsequent to receipt of the input/output request.

* * * * *

UNITED STATES PATENT AND TRADEMARK OFFICE
CERTIFICATE OF CORRECTION

| | | |
|---|---|---|
| PATENT NO. | : 7,373,438 B1 | Page 1 of 1 |
| APPLICATION NO. | : 10/829854 | |
| DATED | : May 13, 2008 | |
| INVENTOR(S) | : Matthew S. DeBergalis | |

It is certified that error appears in the above-identified patent and that said Letters Patent is hereby corrected as shown below:

On the Title Page,
In Section (62) of the above referenced patent, please correct the Related U.S. Application Data as shown below:

(62) Division of application No. 10/171,140, filed on Jun. 13, 2002, ~~now abandoned~~.

Signed and Sealed this

Eighth Day of September, 2009

David J. Kappos
*Director of the United States Patent and Trademark Office*